United States Patent
Geels et al.

(10) Patent No.: US 10,620,893 B2
(45) Date of Patent: Apr. 14, 2020

(54) METHOD FOR ESTABLISHING A REALISTIC PREVIEW OF SHEETS OF A PRINT JOB

(71) Applicant: Océ Holding B.V., Venlo (NL)

(72) Inventors: Jan H. Geels, 's-Hertogenbosch (NL); Marvin P. Brunner, Nijmegen (NL); Louis C. M. Van Gool, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 0 days.

(21) Appl. No.: 16/259,660

(22) Filed: Jan. 28, 2019

(65) Prior Publication Data

US 2019/0243590 A1      Aug. 8, 2019

(30) Foreign Application Priority Data

Feb. 5, 2018    (EP) .................................... 18155103

(51) Int. Cl.
 *G06F 3/12*    (2006.01)
 *H04N 1/00*    (2006.01)

(52) U.S. Cl.
 CPC .......... *G06F 3/1256* (2013.01); *G06F 3/1205* (2013.01); *G06F 3/1208* (2013.01); *G06F 3/1278* (2013.01); *G06F 3/1285* (2013.01); *H04N 1/00456* (2013.01)

(58) Field of Classification Search
 CPC ........... H04N 1/00161; H04N 1/00164; H04N 1/0044; H04N 1/00456; G06F 3/1208; G06F 3/1256; G06F 17/212; G06F 3/1285; G06F 3/1278

USPC ....... 358/1.11–1.18, 1.9, 2.1, 530, 448, 540; 715/209
See application file for complete search history.

(56) References Cited

U.S. PATENT DOCUMENTS

| | | | | |
|---|---|---|---|---|
| 6,078,936 A * | 6/2000 | Martin | ................. | H04N 1/6011 345/3.1 |
| 2003/0030652 A1* | 2/2003 | Billmaier | ............... | H04N 5/445 345/629 |
| 2007/0240042 A1* | 10/2007 | Sato | ....................... | G06F 3/1208 715/209 |
| 2008/0225346 A1* | 9/2008 | Mano | ....................... | H04N 1/40 358/448 |
| 2011/0035759 A1* | 2/2011 | Williams | .............. | G06F 40/103 719/328 |

(Continued)

FOREIGN PATENT DOCUMENTS

| | | |
|---|---|---|
| EP | 2 784 659 A1 | 10/2014 |
| JP | 2002-103726 A | 4/2002 |
| JP | 2002103726 A * | 4/2002 |

OTHER PUBLICATIONS

European Search Report for EP 18 15 5103, dated Jun. 25, 2018.

*Primary Examiner* — Chad Dickerson
(74) *Attorney, Agent, or Firm* — Birch, Stewart, Kolasch & Birch, LLP (57) ABSTRACT

Method and printing system for processing a print job according to print job specifications. A realistic preview image of a plurality of pages of the print product is established and displayed taking into account the print job specifications and print job content. Parts of underlying sheets which parts become visible in the realistic preview image are determined and their content and physical properties are determined and incorporated into the realistic preview image.

13 Claims, 10 Drawing Sheets

(56) References Cited

U.S. PATENT DOCUMENTS

| | | | |
|---|---|---|---|
| 2013/0135700 A1* | 5/2013 | Tamura | H04N 1/3873 358/530 |
| 2014/0298166 A1* | 10/2014 | Kuranoshita | G06F 3/1256 715/251 |
| 2015/0317543 A1* | 11/2015 | Fujita | G06F 3/1244 358/1.15 |
| 2016/0162222 A1* | 6/2016 | De Boer | G06F 3/1282 358/1.15 |

* cited by examiner

METHOD FOR ESTABLISHING A REALISTIC PREVIEW OF SHEETS OF A PRINT JOB

FIELD OF THE INVENTION

The present invention relates to a method for processing a print job according to print job specifications by means of a printing system in order to deliver a print product, the printing system comprising a user interface, the method comprising the steps of a) establishing a realistic preview image of a plurality of pages of the print product taking into account the print job specifications and print job content, and b) displaying the realistic preview image on the user interface.

In a print production environment the production of a print job can be managed at the printing system comprising a software system that handles the image data to be printed according to specifications of the print job, schedules the actions to be performed by operators and provides status feedback on the production progress to the production manager and—for example through the internet—to the end customers. The software system may be installed at the printing system or on a computer system connected to the printing system.

The print product, being an end product of the print job, may be a document on paper or a document on any other media type. Specifications of the print job, such as properties of the end product, are submitted by means of a product order or job ticket to the printing system. The print job specifications are interpreted by the printing system before the production of the print job starts. The print job specifications comprise printing specifications for the printing system, finishing specifications for finishing modules coupled to or in the printing system, and media specifications for the media to be printed upon. The print job may be printed on media from an input holder of a printer being part of the printing system and the printed media may be finished with finishing equipment being part of the printing system. The finishing steps may be part of the sequence of production steps which lead to the end product of the print job.

Print job content may hereinafter also be called print job data. Print job content may be text, digital images, tables, spreadsheets, icons, special characters, etc.

A print engine of the printing system may hereinafter also be called a printing module or a print module.

The user interface of the printing system may be a local user interface at the printing system, a remote user interface at a computer system like a personal computer, a laptop computer, a tablet computer, a personal digital assistant etc., connected via a network—wired or wireless—to the printing system, or a remote user interface at a mobile device connected via a network—wired or wireless, direct or indirect—to the printing system. The mobile device comprising the remote user interface may be a mobile phone, a smart phone, a tablet computer, a smart watch or smart glasses.

BACKGROUND OF THE INVENTION

A realistic preview image of pages of the resulting product takes into account the print job specifications, print job content, media properties and finishing specifications. The realistic preview by means of the realistic preview image may be shown on the user interface as taken from an arbitrary angle above the printed end product of sheets.

An example of a realistic preview is described in patent application US 2016/0162222 However such a preview takes only into account rectangular stacked ordinary sheets and not all visual aspects of the print product.

Sheets of media are used to print pages of content on at least one side of the sheet.

A sheet has two sides which may be printed upon. These two sides are hereinafter referenced to as pages of the sheet.

When a sheet is processed single-sided, content is either printed on a front page or on a back page of the sheet.

When a sheet is processed double-sided, content is printed on the front page and on the back page of the sheet.

It is an object of the invention to establish a more accurate preview on the resulting product of printed pages of sheets of a print product.

SUMMARY OF THE INVENTION

According to the present invention this object is achieved by the method described here-above, wherein the method comprises the further steps of c) determining a part of an underlying page which part is visible in the realistic preview image, d) determining content intended to be printed on the visible part determined in step c), e) determining physical properties of a media on which the visible part determined in step c) is intended to be printed, and f) adapting the realistic preview image by incorporating the content determined in step d) and the physical properties of the media of the visible part determined in step e) in the visible part in the realistic preview image.

The part of the underlying page which part is intended to be visible in the realistic preview image may be derived from the print job specifications for the pages of the print job and from the media and finishing specifications for the sheets of the print job. The underlying page may be page from an underlying sheet, i.e. a sheet lying under an overlying sheet which is also visible in the realistic preview image. The underlying page may be a back side of a sheet. The sheet comprises in that case the overlying page and the underlying page. The terms overlying page and underlying page are addressed according to a direction perpendicular to the plane of the pages, and also of the area of the sheets. Usually said direction corresponds to a direction of a thickness dimension of the sheets. A top view observation may be from a viewpoint above the plane of the pages. According to the invention the part of the underlying page which becomes visible in the realistic preview image extends itself in at least one direction of the plane of the pages.

According to an embodiment the determined part is visible outside a contour of an overlying page in the realistic preview image. The situation may occur when the underlying page is not completely covered—observed from a top view position—by the overlying page. For example, a size of the underlying page is in at least one direction in the plane of the pages larger than the overlying page.

According to an embodiment the determined part is visible inside a contour of an overlying page in the realistic preview image. For example, the determined part is visible through a hole in a sheet comprising the overlying page in the realistic preview image.

For example, the determined part is visible due to an at least partially transparent media used for the sheet comprising the overlying page in the realistic preview image.

In such a case, according to a further embodiment the step of adapting the realistic preview image takes into account the grade of transparency of the at least partially transparent media. In a first situation the determined part may be located on the backside of a sheet comprising the overlying page as a front side. In a second situation the determined part may be located on at least one page of at least one underlying sheet.

According to an embodiment the printing system comprises a plurality of production modules, at least one of the production modules being a printing module and the determined part is visible as a result of a production step of one of the production modules which is to be performed after a printing step intended to be performed by the printing module. For example, if a production step after printing changes the size or shape of a printed sheet, a part of the underlying page may become visible which part was not visible before the production step is performed. For example, if by means of a finishing step a hole is created in a sheet comprising the overlying page, a new part of the underlying page will become visible in the realistic preview image. The production module may be a cutter which cuts a slit into a sheet or a folder which folds a sheet according to at least one fold. The printing system may use the cutter and/or the folder. The sheet may be self-cut with a slit to allow part of the sheet to be back folded to the front page of the sheet. Separate pieces may be cut off a sheet wherein one part comprises a slit to allow another part to be partially put through the slit.

According to an embodiment a sheet is cut into a plurality of sheet parts which in the end product may even be movable with respect to each other. One part may be movable with respect to another part. According to a further embodiment the plurality of sheet parts are movable with respect to each other in the realistic preview image. The one part mentioned here-above is movable in the realistic preview image and thus animating the movement of the one part with respect to the other part.

According to an embodiment one of the production modules is a folding device and the determined part is on the backside of the overlying page and visible due to a folding of a sheet comprising the overlying page and the backside of the overlying page. The sheet may have such a format that more than one part of the backside of the sheet and more than one part of the front side of the sheet are visible in the realistic preview image.

According to an embodiment the determined part is visible due to pre-processed media used for a sheet comprising the overlying page in the realistic preview image. A contour of a page or sheet or a hole in a page or sheet may be predetermined by the pre-processed media which is put in an input holder of the printing system. The media specifications of the pre-processed media are used to determine and calculate the realistic preview image according to the invention.

According to an embodiment the realistic preview image is a spread view image of the sheets. A spread view is for example a view on at least a pair of neighboring pages in a document or booklet. In this case physical properties and content—defined by the print job data—of at least one underlying sheet preceding a first page of the spread view and of at least one underlying sheet succeeding a second page of the spread view should be taken into account if appropriate according to the invention.

According to an embodiment the realistic preview image is a top image of the sheets. A top view is for example a view on the first page of a document, for example the cover page of the document. In this case content—defined by the print job data—of at least one next page in the document should be taken into account if appropriate according to the invention.

According to an embodiment the method comprises the step of changing the view angle corresponding to the realistic preview established by the realistic preview image. The realistic preview image may be established as long as the virtual observer is above the plane coinciding with the at least one upper page of a resulting product.

According to an embodiment the physical properties of the media on which the determined visible part is intended to be printed, comprises at least one out of color properties, gloss properties and texture properties. The physical properties are used to determine and calculate the realistic preview image according to the invention.

The present invention also relates to a printing system for processing a print job according to print job specifications in order to deliver a print product, the printing system comprising a user interface for displaying images, a print job receiver for receiving a print job with print job specifications, a print job controller configured to determine a realistic preview image of the print product according to print job specifications, the realistic preview image being displayable on the user interface before, during or after the printing of the print job, wherein the print controller is configured    a) to determine a part of a page of an underlying sheet which part is visible in the realistic preview image, the underlying sheet being a sheet lying under an overlying sheet which is visible in the realistic preview image,    b) to determine content intended to be printed on the visible part determined in step a),    c) to determine physical properties of a media on which the visible part determined in step a) is intended to be printed, and    d) to adapt the realistic preview image by incorporating the content determined in step b) and the physical properties of the media of the visible part determined in step c) in the visible part in the realistic preview image.

The invention also relates to a non-transitory recording medium comprising computer executable program code configured to instruct a computer to perform a method according to the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

Hereinafter the present invention is further elucidated with references to the appended drawings showing non-limiting embodiments and wherein.

DETAILED DESCRIPTION OF EMBODIMENTS

Figure 1:
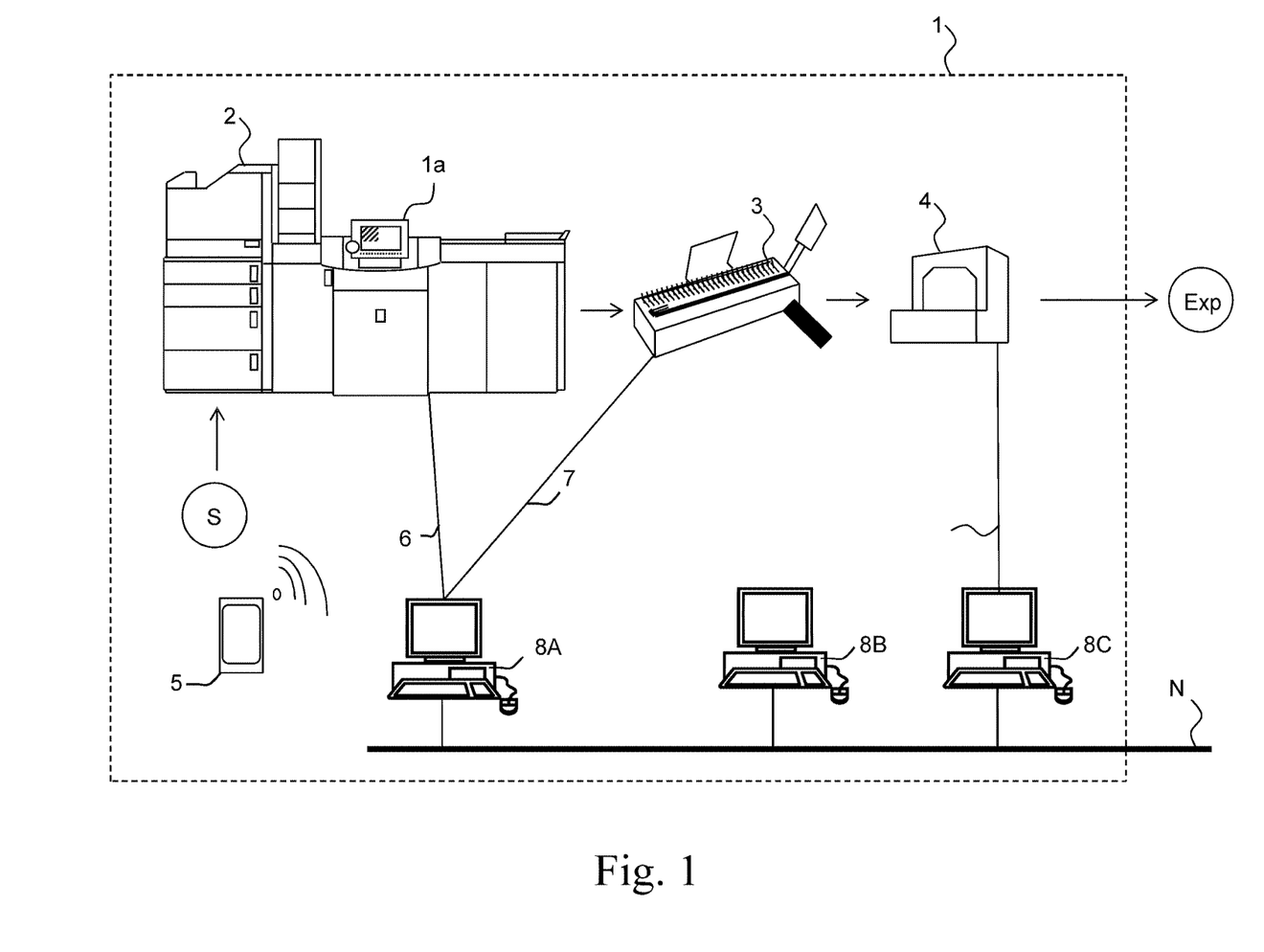
FIG. 1 is a print system configured to apply the invented method.

FIG. 1 is a print system 1 comprising a number of workstations 8B, 8C, which may be personal computers or other devices for preparing print jobs and corresponding image data for prints to be printed. These workstations have access to a network N for transferring the image data to a print controller 8A that is configured to receive print jobs for prints and derive partial images if needed. The print controller 8A controls the printing process of a first production module 2, which is a print engine 2. The print controller 8A and the print engine 2 is part of the print system 1. The print engine 2 is suitable for applying recording material on media in order to print a print job on a media. The print engine 2 is connected to the print controller 8A via a network line 6. The print engine 2 may have the print controller 8A inside. The print engine may have a local user interface 1a for enabling an operator to enter or read information, like selections or instructions. According to an embodiment the print system 1 also comprises a mobile device 5 which is wireless connected to the print controller 8A. The mobile device 5 comprises a user interface for displaying a realistic preview image according to the method of the invention. The user interface according to the invention may reside on at least one or the mobile device 5, the local user interface 1a, the printer controller 8A, the workstations 8B and the workstation 8C. Since all these devices are connected to the network N, images shown at their user interface according to the invention may be synchronized. The print system 1 may further comprise a second production module 3 which is a puncher 3, and a third production module 4 which is a binder 4. It is noted that the first production module 2, the second production module 3 and the third production module 4 are arbitrarily selected and other production modules may be envisioned which form a configurable plurality of production modules in order to produce an end product via intermediate products. As a starting point S the print job data and the print job specifications are submitted to the print controller 8A. The print controller 8A sends the job information to the print engine 2. The print engine 2 delivers in a first production step a first intermediate product, being a media on which the image or images specified in the print job specifications will be printed. The first intermediate product is input for the puncher 3. The puncher 3 delivers in a second production step a second intermediate product, a printed media with holes. The second resulting product is input for the binder 4. The binder 4 delivers in a third production step an end product of the print system 1, a bound printed media with holes. In this example the end product of the print system 1 is delivered to an expedition department Exp.

According to the method of the invention a realistic preview image is constructed of the end product for display on at least one user interface of the print system 1. Thereto the print controller 18A comprises an image processing module like a GPU (not shown) for creating, adapting—and rasterizing—the preview image according to the method of the invention for display on the at least one user interface of the print system 1.

The invention will now be elucidated by means of examples of realistic preview images of end products according to the method of the invention. However, according to the invention only one sheet—partially transparent or folded—comprising two pages, a front side and a back side—may be comprised in the print job or even more than two sheets may be comprised in the print job.

Figure 2A:
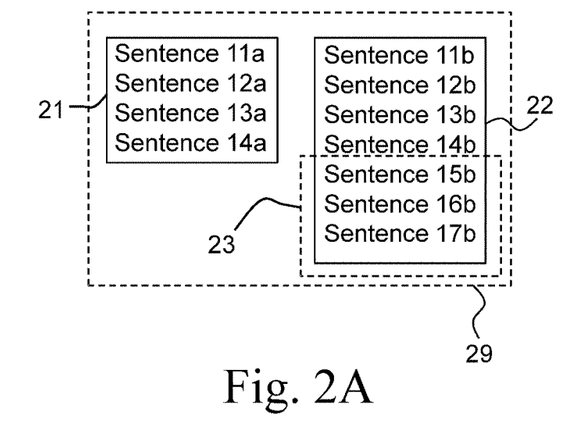
FIG. 2A shows pages of a document to be processed.

FIG. 2A shows a number of sheets of a single-sided print job 29 to be printed. Two sheets 21, 22 are intended to be processed having different sizes. For example, the first sheet 21 is an A5 sheet of a white colored media type and the second sheet 22 is an A4 sheet of a yellow colored media type. The kind of media type for a sheet of the print job 29 is extracted from the print job properties accompanying the print job 29. According to the print job specifications the sheets 21, 22 are intended to be single-sided printed and upper-left stapled after printing. For convenience reasons the print job 29 comprises two sheets 21, 22, but examples of print jobs with more than two sheets may be envisioned.

Figure 2B:
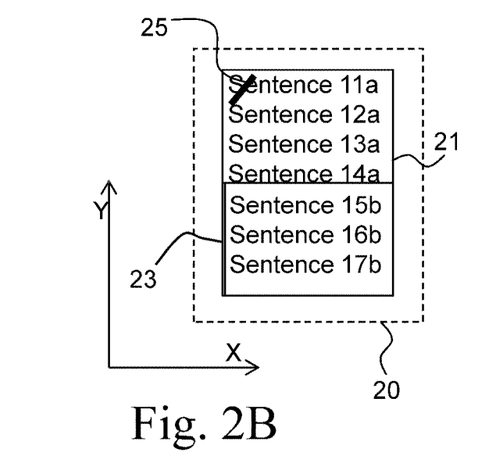
FIG. 2B shows a realistic preview image of the pages of FIG. 2A.

FIG. 2B shows a realistic preview image 20 according to the invention. Since the first sheet 21 is half the size of the second sheet 22, a part 23 of the second sheet 22 as shown in FIG. 2A and FIG. 2B will become visible in the realistic preview image 20 of the end product. The end product is seen from a top view or from an arbitrary view from above the plane of the sheets. The plane of the sheets is indicated by an XY plane. Content intended to be printed on each sheet 21, 22 is shown when the content becomes visible in the preview image 20. In this case the content of the first sheet 21 is text and the content for the second sheet 22 is also text. The preview takes also into account the physical properties of the sheets 21, 22. The yellowness of part 23 of the second sheet 22 is taken into account in the preview image 20. The yellowness of the part 23 of the second sheet 22 is indicated in FIG. 2B by the grey color in the part 23. In an upper left corner of the first sheet 21 of the end product also a representative image 25 of a staple is made visible, since according to the print job specifications the sheets 21, 22 are intended to be stapled at the upper-left location on the sheets.

Figures 3A, 3B:
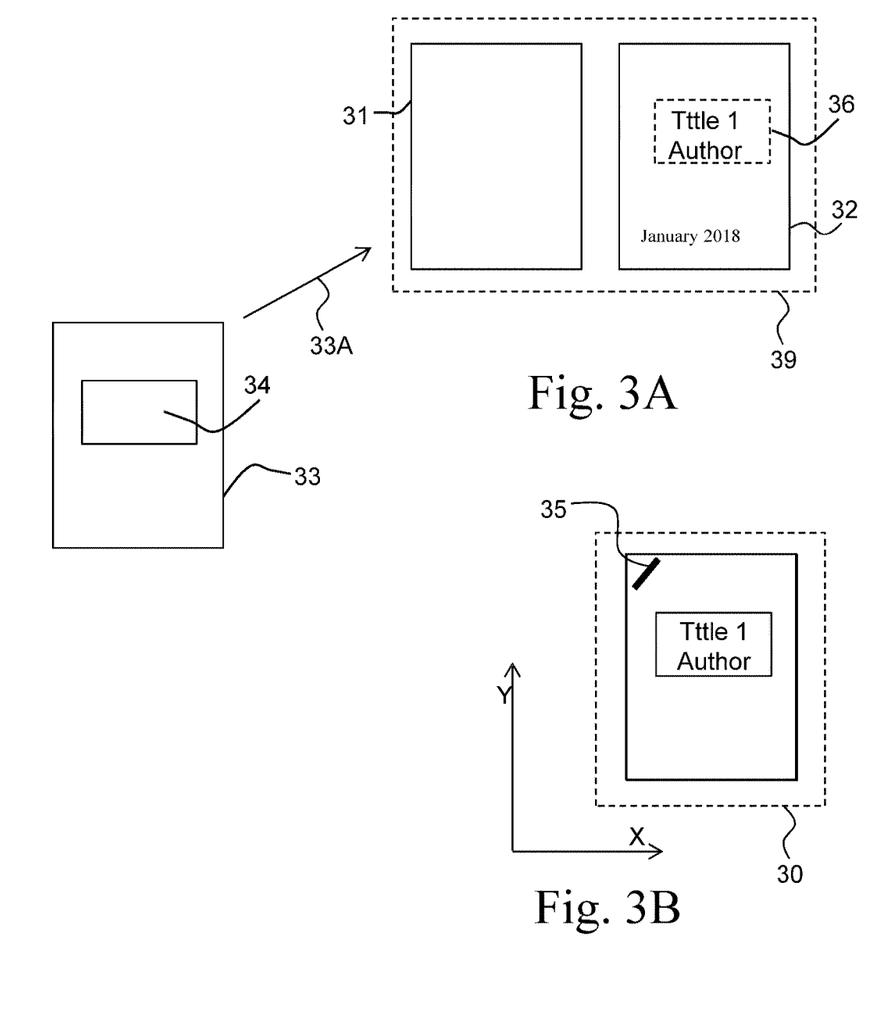
FIG. 3A shows pages of a document to be processed.
FIG. 3B shows a realistic preview image of the pages of FIG. 3A.

FIG. 3A shows a number of sheets of a single-sided print job 39 to be printed. Two sheets 31, 32 are intended to be processed having same sizes but different shapes. For example, the first sheet 31 is an A4 sheet of a yellow colored media type and the second sheet 32 is an A4 sheet of a white colored media type. The first sheet 31 is pre-processed and comprises a hole 34 as indicated in the media type representation 33 of the first sheet 31. The kind of media type for a sheet of the print job 39 is extracted from the print job properties accompanying the print job 39. According to the print job specifications the sheets 31, 32 are intended to be upper-left stapled after printing. The first sheet 31 is a cover sheet while the second sheet 32 is intended to be printed with a title text 36 being "Title 1, Author". For convenience reasons the print job 39 comprises two sheets 31, 32, but examples of print jobs with more than two sheets may be envisioned.

FIG. 3B shows a realistic preview image 30 according to the invention. Since the first sheet 31 is comprises a hole 34, a part 36 of the second sheet 32—the title text—will become visible in the realistic preview image 30 of the end product seen from a top view or from an arbitrary view from above the plane of the sheets. The plane of the sheets is indicated by an XY plane. Also the preview takes into account the physical properties of the sheets 21, 22. The whiteness of part 36 of the second sheet 32 is taken into account in the preview image 30. The yellowness of the first sheet 31 is indicated in FIG. 2B by the grey color of the first sheet 31. In an upper left corner of the first sheet 31 of the end product also a representation 35 of a staple is made visible, since according to the print job specifications the sheets 31, 32 are intended to be stapled at the upper-left location on the sheets.

Figure 4A:
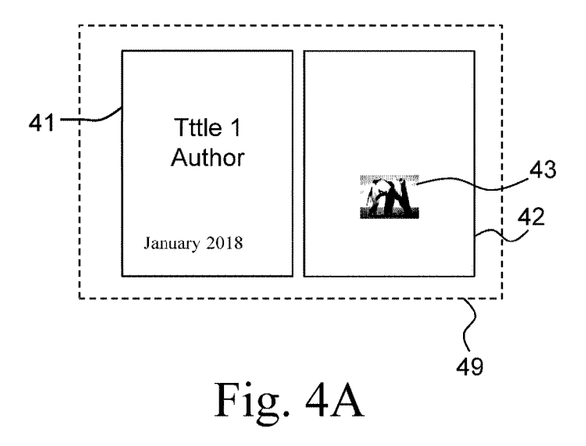
FIG. 4A shows pages of a document to be processed.

FIG. 4A shows a number of pages of a double-sided print job 49 to be printed. Two pages 41, 42 are intended to be processed having same size and shape. The pages 41, 42 are intended to be printed on one sheet of a transparent media type. For example, the first page 41 and the second page 42 are A4 sized and have to be printed on the front side and the back side of the one sheet of the transparent media type respectively. The kind of media type for the one sheet of the print job 49 is extracted from the print job properties accompanying the print job 49. According to the print job specifications the pages 41, 42 are intended to be printed double-sided on the one transparent sheet. The first page 41 comprises text items. The second page 42 comprises an image 43 of penguins. For convenience reasons the print job 49 comprises two pages 41, 42, but examples of print jobs with more than two pages may be envisioned.

Figure 4B:
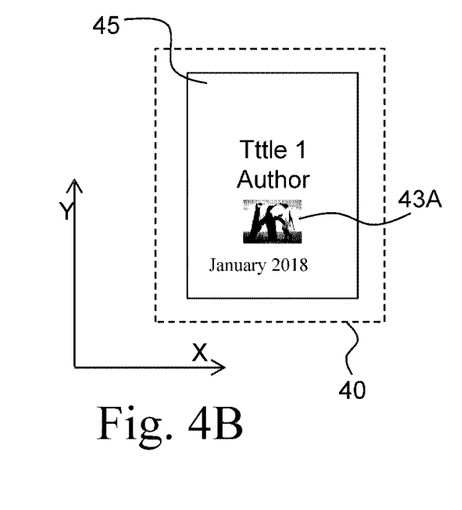
FIG. 4B shows a realistic preview image of the pages of FIG. 4A.

FIG. 4B shows a realistic preview image 40 according to the invention. The one transparent sheet is represented by a sheet 45 in FIG. 4B. Since the sheet 45 is of a transparent media type, the image 43 on the second page 42 is visible in the realistic preview image 40 of the end product seen from a top view or from an arbitrary view from above the plane of the one sheet. The plane of the one sheet is indicated by an XY plane. In FIG. 4B an image 43A of the penguins in the realistic preview image 40 is mirrored with respect to the image 43 of the penguins on the second page 42 in FIG. 4A.

Figure 5A:
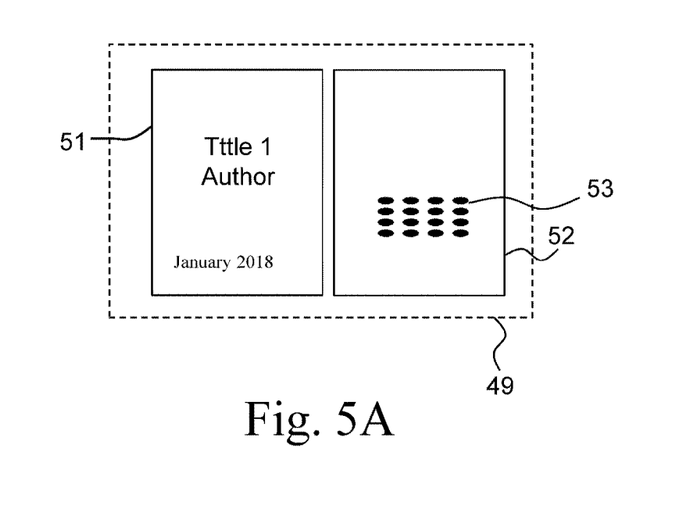
FIG. 5A shows pages of a document to be processed.

FIG. 5A shows a number of pages of a double-sided print job 59 to be printed. Two pages 51, 52 are intended to be processed having same size and shape. The pages 51, 52 are intended to be printed on one sheet of a partially transparent media type. For example, the partially transparent media type may be a white colored media type of a small weight per area, permitting a shining through of the printed backside of a sheet to the front side of the sheet. The first page 51 and the second page 52 are A4 sized and have to be printed on the front side and the back side of the one sheet of the transparent media type respectively. The kind of media type for the one sheet of the print job 59 is extracted from the print job properties accompanying the print job 59. According to the print job specifications the pages 51, 52 are intended to be printed double-sided on the one partially transparent sheet. The first page 51 comprises text items. The second page 52 comprises an image 53 of a black dot pattern. For convenience reasons the print job 59 comprises two pages 51, 52, but examples of print jobs with more than two pages may be envisioned.

Figure 5B:
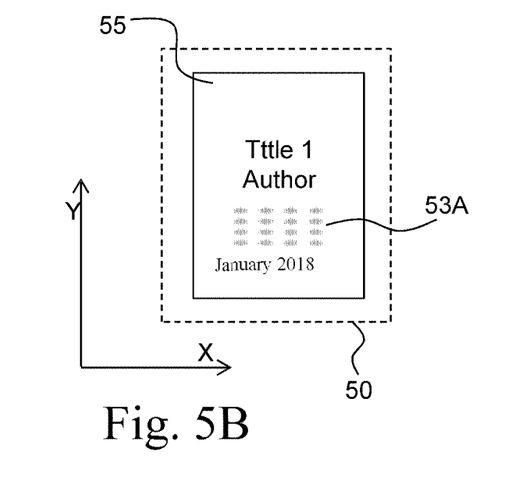
FIG. 5B shows a realistic preview image of the pages of FIG. 5A.

FIG. 5B shows a realistic preview image 50 according to the invention. The one partially transparent sheet is represented by a sheet 55 in FIG. 5B. Since the one sheet 55 is of a partially transparent media type, the image 53 on the second page 52 is visible in the realistic preview image 50 of the end product seen from a top view or from an arbitrary view from above the plane of the one sheet. The plane of the one sheet is indicated by an XY plane. In FIG. 4B an image 53A of the dot pattern 53 is shown in the realistic preview image 50 by means of a grey color. The kind of grey color of the image 53A corresponds to a grade of transparency of the one sheet 55.

Figures 6A, 6B:
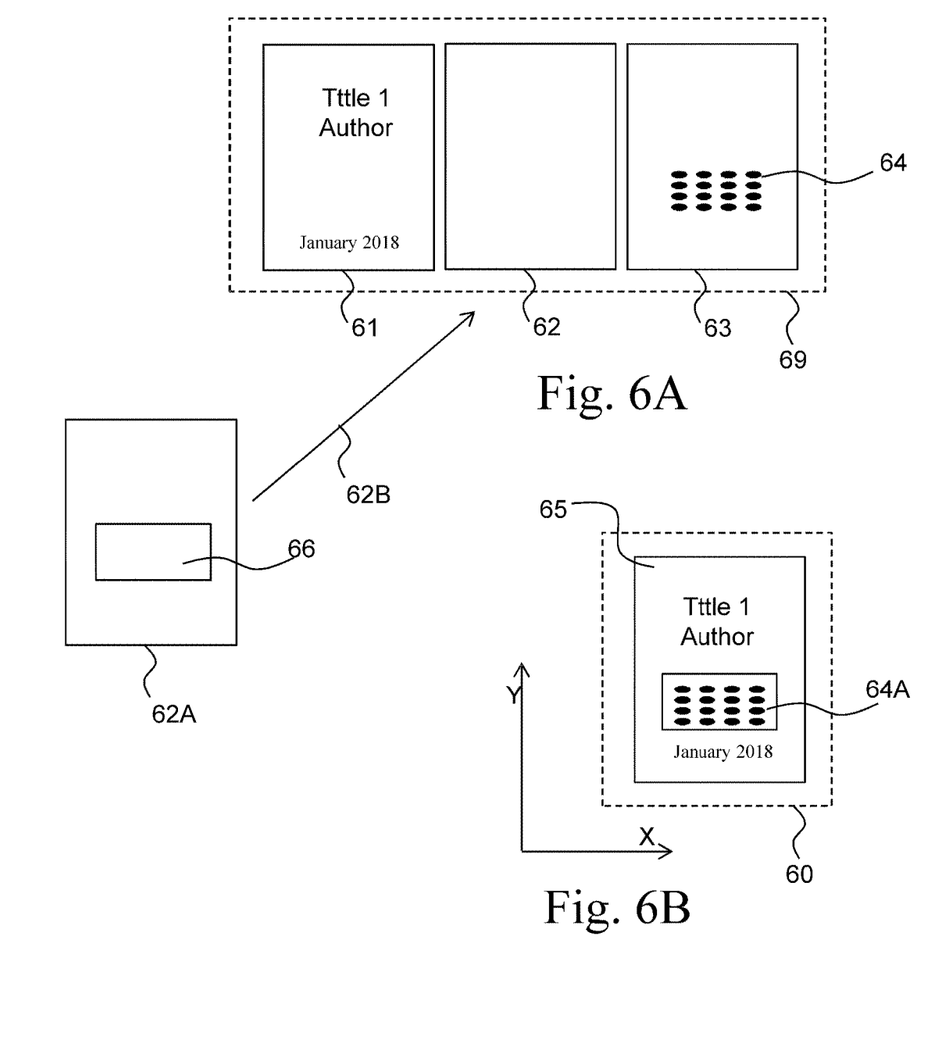
FIG. 6A shows pages of a document to be processed.
FIG. 6B shows a realistic preview image of the pages of FIG. 6A.

FIG. 6A shows three pages 61, 62, 63 of a single-sided print job 69 to be printed. Two pages 61, 63 are intended to be processed having same size and shape. A first page 61 is intended to be printed on one A4 sized sheet of a transparent media type. The first page 61 contains textual content. A second page 62 is intended to be printed on an A4 sized, pre-processed, media type. For example, the pre-processed media type is a yellow colored media type 62A comprising a hole 66. The hole 66 has a rectangular shape, but other shapes of the hole 66 or even more than one hole may be envisioned. The second page 62 does not contain any content of text or images, but examples may be envisioned wherein the second page 62 actually does contain content of text and/or images. A third page 63 comprises an image 64 of a black dot pattern. A media type of the third page 63 is specified to be a white colored A4 sized media type. The kind of media types for the sheets for the pages 61, 62, 63 of the print job 69 are extracted from the print job properties accompanying the print job 69. According to the print job specifications the pages 61, 62, 63 are intended to be printed single-sided, i.e. on three different sheets respectively. For convenience reasons the print job 69 comprises three pages 61, 62, 63 but examples of print jobs with one, two or more than three pages may be envisioned.

FIG. 6B shows a realistic preview image 60 according to the invention. The three pages 61, 62, 63 are represented by a sheet image 65 in FIG. 6B. Since the first page 61 is intended to be printed on a transparent media type, the yellow color of the second page 62 is visible in the realistic preview image 60 of the end product seen from a top view or from an arbitrary view from above the plane of the sheets. The plane of the sheets is indicated by an XY plane. In FIG. 6B an image 64A of the dot pattern 64 on the third page 63 is shown in the realistic preview image 60 since it can be seen through the transparent sheet corresponding to the first page 61 and through the hole 66 in the second sheet corresponding to the second page 62. A background of the image 64A in the realistic preview image 60 is white colored due to the white colored media type specified for the third page 63 in the print job properties of the print job 69.

Figure 7A:
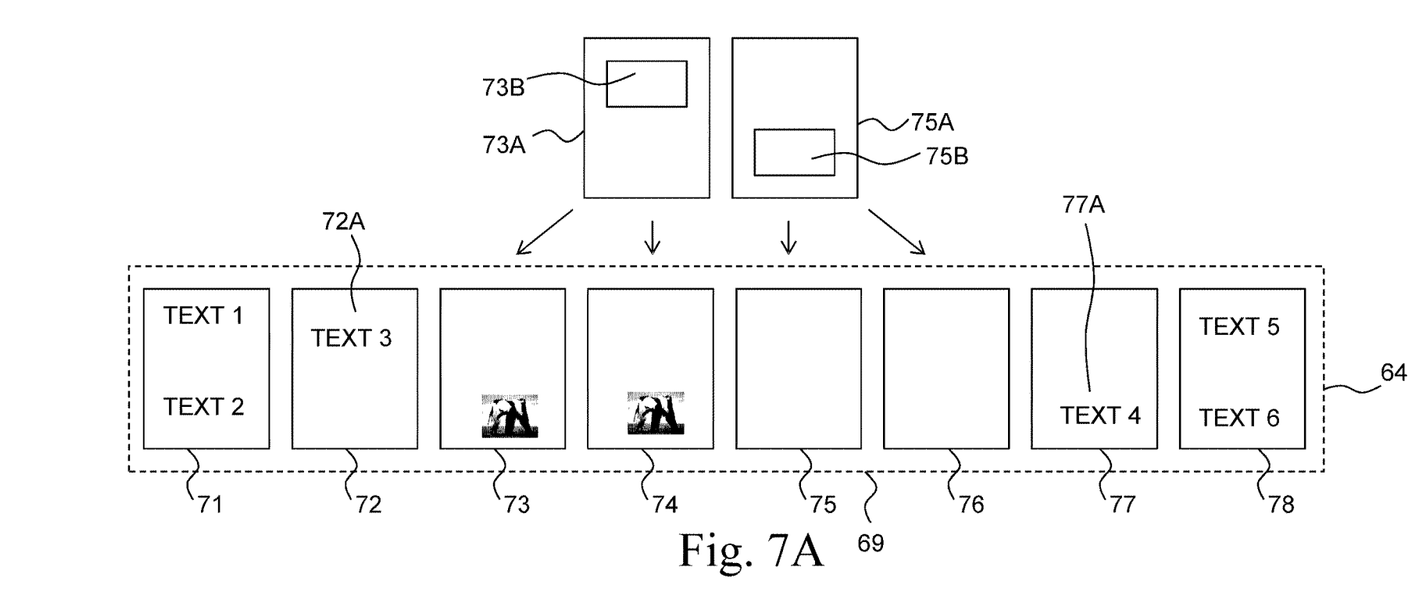
FIG. 7A shows pages of a document to be processed.

FIG. 7A shows eight pages 71-78 of a double-sided print job 79 to be printed and to be finished as a small booklet of four sheets. The eight pages 71-78 are intended to be processed on four sheets having a same size.

A first page 71 and a second page 72 are intended to be printed on one A4 sized sheet of a white colored media type. The first page 71 and the second page 72 contain textual content.

A third page 73 and a fourth page 74 are intended to be printed on an A4 sized sheet of a pre-processed media type. For example, the pre-processed media type is a white colored media type 73A comprising a hole 73B. The hole 73B has a rectangular shape, but other shapes of the hole 73B or even more than one hole may be envisioned. The third page 73 and the fourth page 74 contain images of penguins.

A fifth page 75 and a sixth page 76 are intended to be printed on an A4 sized sheet of a pre-processed media type.

For example, the pre-processed media type is a yellow colored media type 75A comprising a hole 75B. The hole 75B has a rectangular shape, but other shapes of the hole 75B—for example a circular shape—or even more than one hole may be envisioned. The fifth page 75 and the sixth page 76 contain no text or images, but examples may be envisioned wherein the fifth page 75 and/or the sixth page 76 actually do contain content of text and/or images.

A seventh page 77 and an eighth page 78 are intended to be printed on one A4 sized sheet of a white colored media type. The seventh page 77 and the eighth page 78 contain textual content.

Figure 7B:
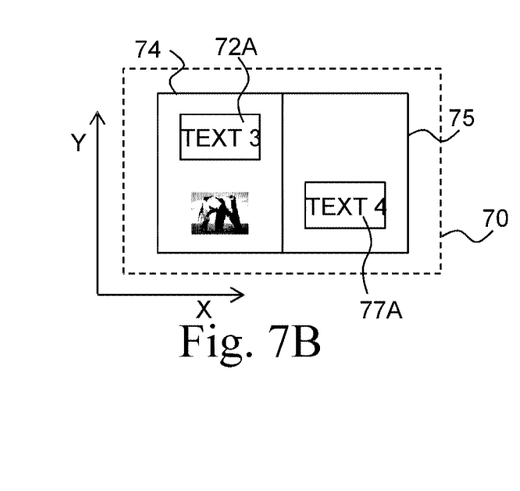
FIG. 7B shows a realistic preview image of the pages of FIG. 7A.

FIG. 7B shows a realistic preview image 70 according to the invention. The realistic preview image 70 is a spread view of the booklet lying open on the fourth page 74 of the backside of the second sheet of the booklet and the fifth page 75 of the front side of the third sheet of the booklet. Since both sheets, i.e. the second sheet containing the third page 73 and the fourth page 74 and the third sheet containing the fifth page 75 and the sixth page 66 are specified to be printed on the pre-processed media sheets 73A, 75A with holes 73B, 75B respectively, a part of the second page 72 and a part of the seventh page 77 are visible in the realistic preview image 70.

Figure 8A:
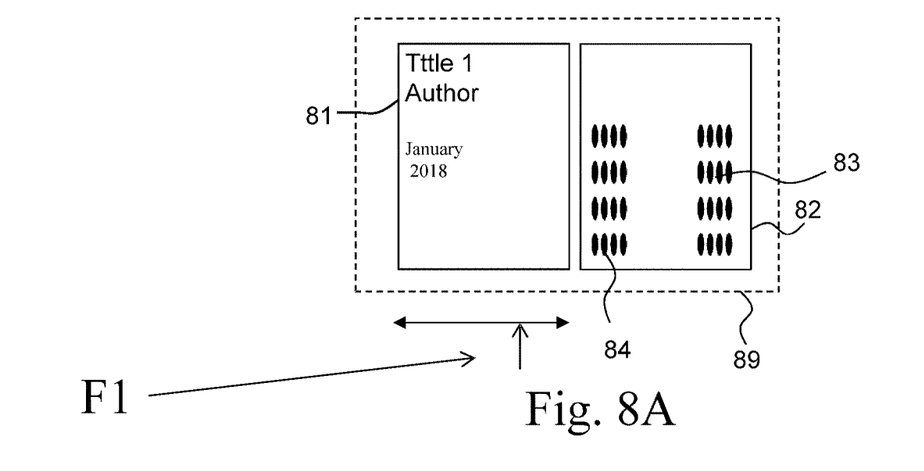
FIG. 8A shows pages of a document to be processed.

FIG. 8A shows two of pages of a double-sided print job 89 to be printed. Two pages 81, 82 are intended to be processed having same size and shape, since the pages 81, 82 are a front side and a backside of one sheet. The sheet of the pages 81, 82 is intended to be folded according to a folding instruction F1 derived from the print job specifications of the print job 89. The folding may be executed by a folding device which is placed behind or inside of the printing engine of the printing system. Content of the first page 81 is text content. Content of the second page 82 is a first image 83 of a black dot pattern and a second image 84 of a black dot pattern. An image printed on one sheet of a partially transparent media type. According to the print job specifications the pages 81, 82 are intended to be printed double-sided on the one sheet. For convenience reasons the print job 89 comprises two pages 81, 82, but examples of print jobs with more than two pages or another kind of folding instruction—for example a Z-fold of one sheet—may be envisioned.

Figure 8B:
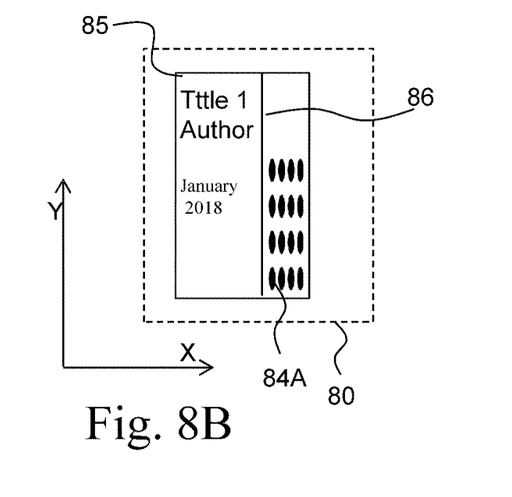
FIG. 8B shows a realistic preview image of the pages of FIG. 8A.

FIG. 8B shows a realistic preview image 80 according to the invention. The one sheet is represented by a sheet image 85 in FIG. 8B. Since the one sheet containing the pages 81, 82 of FIG. 8A is specified to be folded according to the folding instruction F1, the second image 84 on the second page 82 is visible in the realistic preview image 80 of the end product seen from a top view or from an arbitrary view from above the plane of the one sheet. The second image 84 in the realistic preview image 80 is shown as the image 84A which is a mirrored image of the second image 84. Also a fold line 86 is visible in the realistic preview image 80. The plane of the one sheet is indicated by an XY plane.

The examples of print jobs shown in FIG. 2A-8B are exemplary for the invention, but other examples of print jobs may be envisioned that vary with regard to the shape and size of the sheets, the content of the pages of the sheets, the kind of pre-processing of the sheets, the kind of post-processing of the sheets, the shape of holes in the sheets, the color of the sheets, the transparency grade of the sheets, the plexity of the print job, the print job specifications, etc.

According to a further embodiment the preview image may be observed from another angle above the XY plane. The user interface of the printing system may facilitate a 3D rotation of the preview image in an arbitrary direction.

According to an embodiment the printing system comprises a plurality of production modules, at least one of the production modules being a printing module and the determined part is visible as a result of a production step of one of the production modules which is to be performed after a printing step intended to be performed by the printing module. The print job specifications may comprise finishing instructions for the plurality of production modules which are responsible for the post processing of the sheets printed by the printing module.

Figure 9:
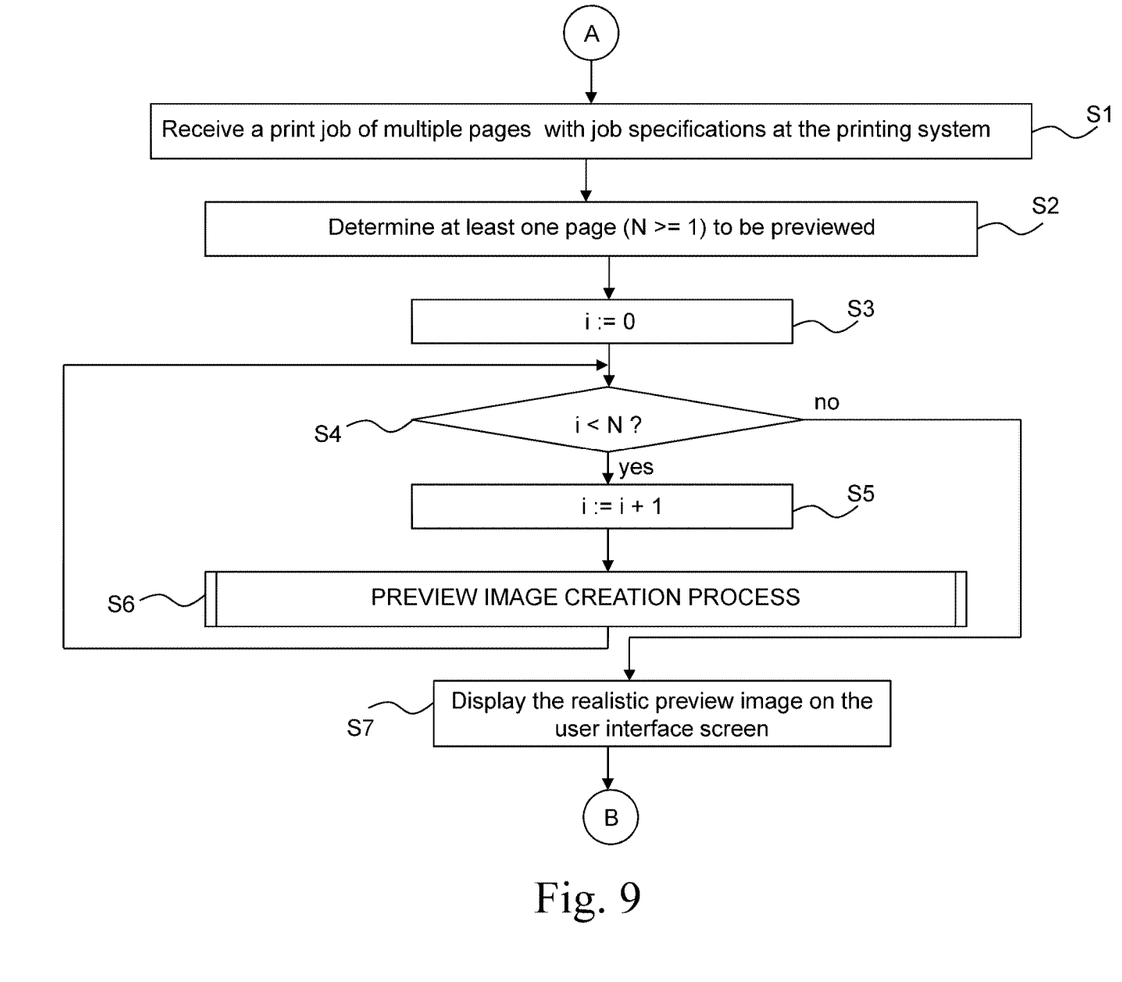
FIG. 9-10 are flow diagrams of an embodiment of the method according to the invention.
Figure 10:
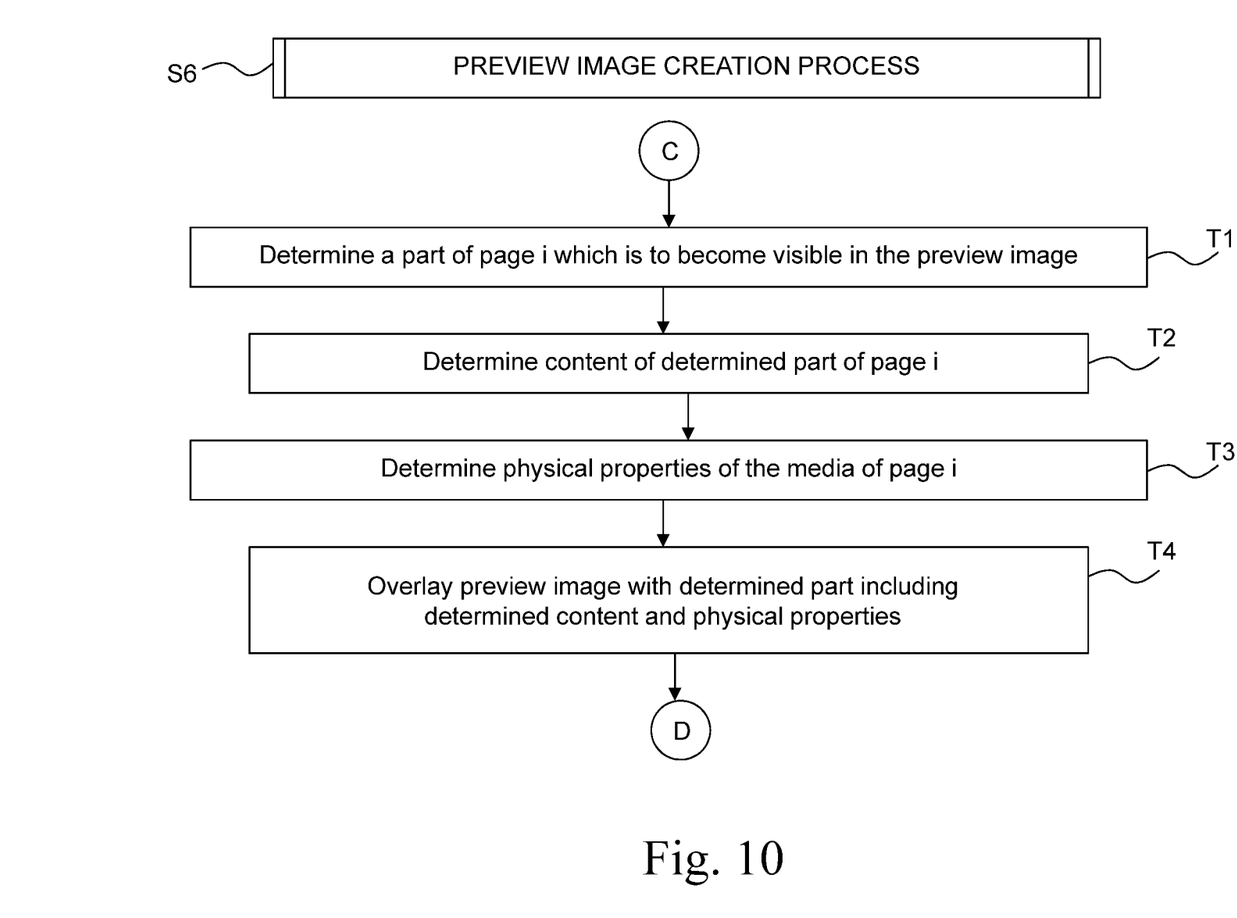

FIG. 9-10 describes a flow diagram of an embodiment of the method according to the invention. The method is suitable for printing a print job according to print job specifications by means of at least one production step on a printing system. The printing system may comprise a plurality of production modules. The printing system comprises a user interface for displaying a preview of the end product to be delivered to the customer.

From a starting point A in FIG. 9 a first step S1 is reached. According to the first step S1 a print job is received at the printing system. The print job comprises job specifications and job content. The print job specifies a number of pages which have to be printed—single-sided or double-sided or in a mix of single-sided and double-sided—on a number of sheets of at least one media type. Usually the print job is submitted to the control unit of the printing system and added to the print queue. The print job specifications concern print job settings comprising printing settings and finishing settings.

According to a second step S2 at least one page of the print job is determined to be previewed. The number of the pages of the at least one page is denoted with a capital N in the diagram in FIG. 9. Default a top view of the end product may be shown at the user interface. In a further embodiment the user interface is configured to let the user browse through the pages of the print job or select at least one page of the print job. Simultaneously the preview image is adapted to the at least one selected page. For a top view of the end product an upper page may be selected. For a booklet a user may browse to a certain page and a spread view of two neighboring pages will become visible in the realistic preview image. The printing specifications, the finishing specifications and media specifications like physical properties of the media type(s) are derived from the print job specifications.

In a third step S3 a first page to be previewed is selected (i:=0). The first page may be a first page of a document of the print job or another page of the document which is selected via the user interface.

In a fourth step S4 it is checked if there is still a page which has to be analysed for a possible adaptation of the realistic preview image (i<N). If so, the method proceeds to a fifth step S5.

If not, the realistic preview image is shown on the user interface in a last step S7. The method ends in an end point B.

In the fifth step S5 a next page of the determined pages is analysed with respect to visibility in the preview image (i:=i+1).

In a sixth step S6 a preview image creation process is started which will be further elucidated in FIG. 10.

In FIG. 10 the preview image creation process S6 starts in a starting point C. The starting point C leads to a first step T1.

According to the first step T1 it is determined which part of page i is intended to become visible in the realistic preview image.

In a second step T2 content of the part of page i determined in the first step T1 is retrieved from the print job data.

In a third step T3 physical properties of the page i are retrieved from the print job specifications. The physical properties may be finishing specifications for the page i—or for a number of pages comprising page i—or media specifications for the page i—or for a number of pages comprising page i.

In a fourth step T4 the preview image is adapted by incorporating the determined part including its determined content and physical properties into the realistic preview image. This incorporation may be an overlaying of the already built up preview image with the determined part of page i. The realistic preview image is constructed by means of an image processing unit residing in the controller of the printing system.

The preview image creation process S6 ends in an end point D.

The above disclosure is intended as merely exemplary, and not to limit the scope of the invention, which is to be determined by reference to the following claims.

The invention claimed is:

1. A method for processing a print job according to print job specifications by means of a printing system in order to deliver a print product, the printing system comprising a user interface, the method comprising the steps of:
   a) establishing a realistic preview image of a plurality of pages of the print product taking into account the print job specifications and print job content;
   b) displaying the realistic preview image on the user interface;
   c) determining a part of a page of an underlying sheet, said part being visible in the realistic preview image, the underlying sheet being a sheet lying under an overlying sheet which is visible in the realistic preview image;
   d) determining content intended to be printed on the visible part determined in step c);
   e) determining physical properties of a media on which the visible part determined in step c) is intended to be printed; and
   f) adapting the realistic preview image by incorporating the content determined in step d) and the physical properties of the media of the visible part determined in step e) in the visible part in the realistic preview image; and
   wherein in the step c), the underlying sheet and the overlying sheet are two separate sheets, and the underlying sheet lies under the overlying sheet.

2. The method according to claim 1, wherein the visible part is visible outside a contour of the overlying sheet in the realistic preview image.

3. The method according to claim 1, wherein the visible part is visible inside a contour of the overlying sheet in the realistic preview image.

4. The method according to claim 3, wherein the visible part is visible through a hole in the overlying sheet in the realistic preview image.

5. The method according to claim 3, wherein the visible part is visible due to an at least partially transparent media used for the overlying sheet in the realistic preview image.

6. The method according to claim 5, wherein the step f) of adapting the realistic preview image takes into account a grade of transparency of the at least partially transparent media.

7. The method according to claim 1, wherein the printing system comprises a plurality of production modules, at least one of the production modules being a printing module and the visible part is visible as a result of a production step of one of the production modules which is to be performed after a printing step intended to be performed by the printing module.

8. The method according to claim 2, wherein the visible part is visible due to pre-processed media used for a sheet comprising the overlying page in the realistic preview image.

9. The method according to claim 1, wherein the method comprises the step of changing a view angle corresponding to the realistic preview established by the realistic preview image.

10. The method according to claim 1, wherein the realistic preview image is a spread view image of the pages or a top view image of the pages.

11. The method according to claim 1, wherein the physical properties of the media on which the visible part determined in step c) is intended to be printed, comprises at least one out of color properties, gloss properties and texture properties.

12. A printing system for processing a print job according to print job specifications in order to deliver a print product, the printing system comprising:
   a display for displaying images; and
   a print job controller including a graphics processing unit configured to receive a print job with print job specifications, and determine a realistic preview image of the print product lording to print job specifications, the realistic preview image being displayable on the user interface before, during or after a printing of the print job,
   wherein the print job controller is configured:
   a) to determine a part of a page of an underlying sheet, said part being visible in the realistic preview image, the underlying sheet being a sheet underlying an overlying sheet which is visible in the realistic preview image;
   b) to determine content intended to be printed on the visible part determined in step a);
   c) to determine physical properties of a media on which the visible part determined in step a) is intended to be printed; and
   d) to adapt the realistic preview image by incorporating the content determined in step b) and the physical properties of the media of the visible part determined in step c) in the visible part in the realistic preview image; and
   wherein in the step a), the underlying sheet and the overlying sheet are two separate sheets, and the underlying sheet lies under the overlying sheet.

13. A non-transitory recording medium comprising computer executable program code configured to instruct a computer to perform the method according to claim 1.

* * * * *